United States Patent

[11] 3,611,847

[72] Inventors Karl Gustav Einer Derman
Savedalen;
Sven-Erik Malmstrom, Reftele, both of
Sweden
[21] Appl. No. 703,335
[22] Filed Feb. 6, 1968
[23] Division of Ser. No. 543,155, Apr. 18, 1966, abandoned, which is a continuation of Ser. No. 195,137, May 16, 1962, abandoned, which is a continuation-in-part of Ser. No. 72,741, Nov. 30, 1960, abandoned.
[45] Patented Oct. 12, 1971
[73] Assignee Forsheda Gummifabrik Aktiebolag
Forsheda, Sweden
[32] Priority Dec. 5, 1959
[33] Sweden
[31] 11482/59

[54] METHOD OF MAKING A SEAL FOR RELATIVELY ROTATABLE PARTS
5 Claims, 9 Drawing Figs.

[52] U.S. Cl........................................ 82/47,
264/159
[51] Int. Cl........................................ B23b 1/00,
B29d 7/16

[50] Field of Search............................................ 82/46, 47,
101; 264/159; 277/25

[56] References Cited
UNITED STATES PATENTS
3,016,251 1/1962 Gilbert........................ 277/95
3,199,191 8/1965 Dega............................ 29/529

Primary Examiner—Harrison L. Hinson
Attorney—Howson and Howson

ABSTRACT: A method of making an annular seal from a generally cylindrical tubular member of an elastomeric material consisting of the steps of forming a recess defined by an inwardly directed surface of revolution at one axial end of the tubular member and providing a deep annular separation in the tubular member adjacent said one axial end which extends from the outer peripheral surface of the tubular member inwardly to and terminating at a point adjacent to but short of the inner peripheral surface to provide a thin flexible sealing lip at one axial end between the annular separation and the surface of revolution whereby the mass of the body portion is at least twice the mass of the flexible sealing lip.

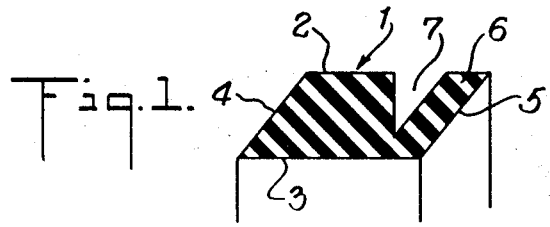
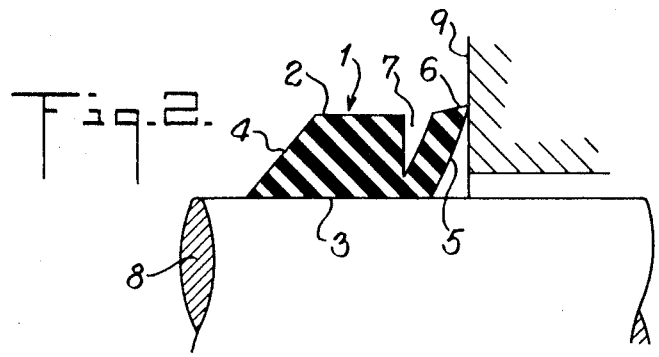
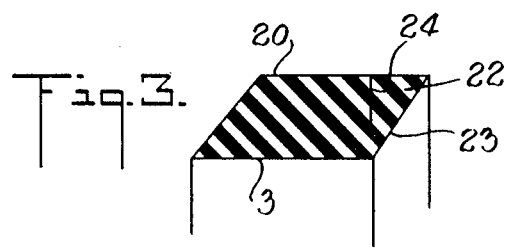 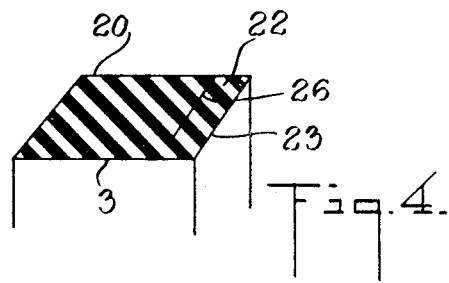
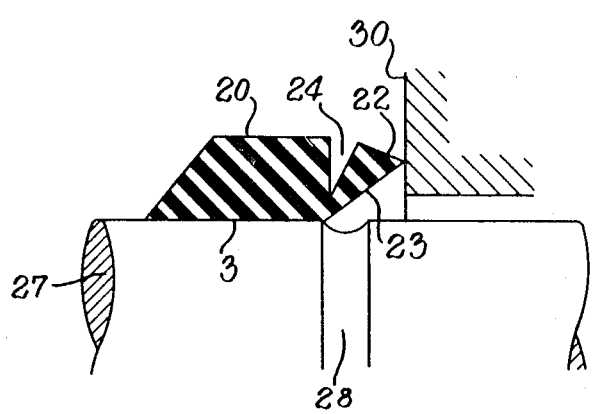

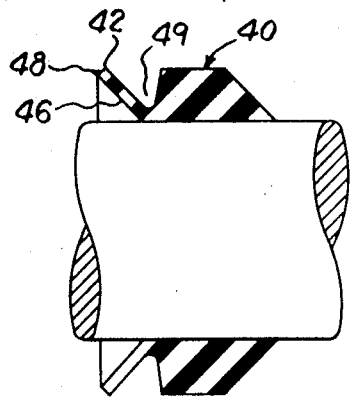
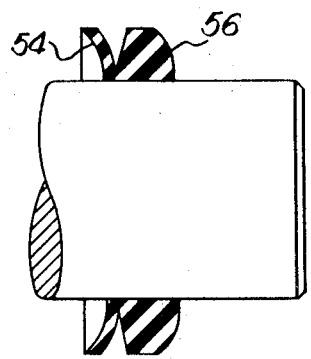
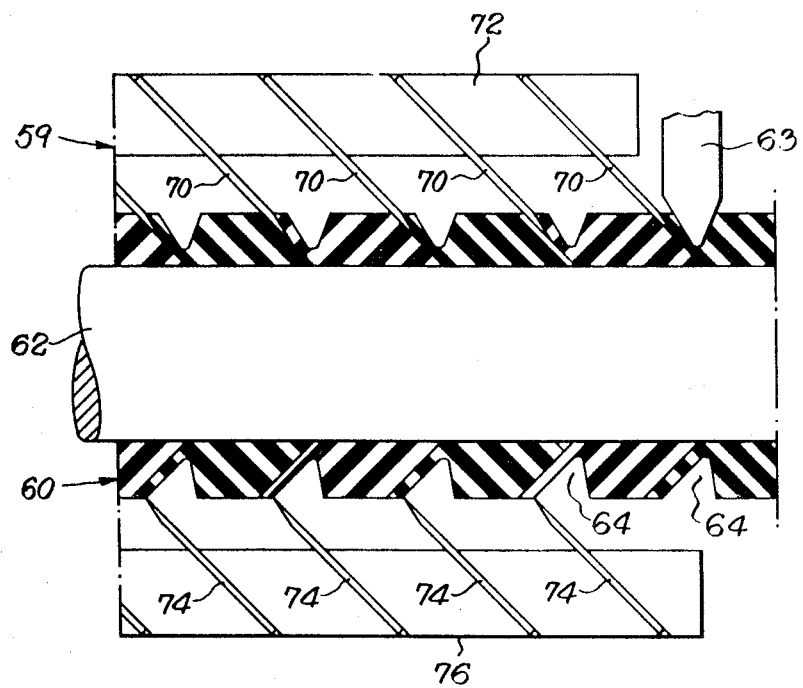

METHOD OF MAKING A SEAL FOR RELATIVELY ROTATABLE PARTS

This application is a division of our copending application Ser. No. 543,155, which in turn was a continuation of our application Ser. No. 195,137, which was continuation-in-part of our application entitled "Seals Between Two Relatively Rotatable Parts" filed on Nov. 30, 1960, bearing Ser. No. 72,741, and now abandoned.

The present invention relates to an annular seal for mounting on a shaft and adapted to provide a seal between the shaft and a member such as a bearing housing having a surface extending transversely to the axis of rotation of the shaft and to a method of making such a seal. Several characteristics properties are required for such an all-round seal for general machine structures. Primarily, its sealing ability both at high and low speeds must be perfectly satisfactory. A gland or labyrinth packing does not meet this requirement because its sealing ability at low speeds is extremely limited. Rubbing seals, on the other hand, do not withstand high peripheral speeds. The ideal seal would thus be one that has a rubbing action at low speeds and functions as a labyrinth packing at high speeds. Other characteristics required of a seal are that it should be economical and easy to mount. Moreover, it should be readjustable in case of wear. The present invention provides a seal having all of the above desired properties and other advantages which will be apparent from the following detailed description and a method for making such a seal.

A seal made in accordance with the present invention consists of a resilient ring of substantially uniform thickness which is adapted to be mounted on a shaft and at one end has an integral annular flexible sealing lip projecting from the inner portion of the ring, which lip is formed between an outwardly open annular groove in the ring and an inwardly directed surface of revolution. The lip of the seal is adapted to engage a surface extending substantially transversely to the axis of rotation of the shaft on which it is mounted with the lip sidewall facing the transverse surface.

Other objects and features of the method of making a seal in accordance with the present invention and the various details of the seal are described in detail hereinafter with reference to the accompanying drawings in which:

FIG. 1 shows one embodiment of seal made in accordance with the present invention;

FIG. 2 shows the seal of FIG. 1 mounted on a shaft in sealing engagement with a surface of a bearing housing or the like;

FIGS. 3 and 4 show other forms of seals made in accordance with the present invention;

FIG. 5 shows the seal illustrated in FIG. 3 mounted on a shaft with the sealing lip thereof in engagement with a surface of a bearing housing;

FIGS. 6 and 7 show still other forms of seals made in accordance with the present invention;

FIG. 8 shows apparatus for carrying out the method of the present invention for making seals of the type set forth above.

Figure 9:
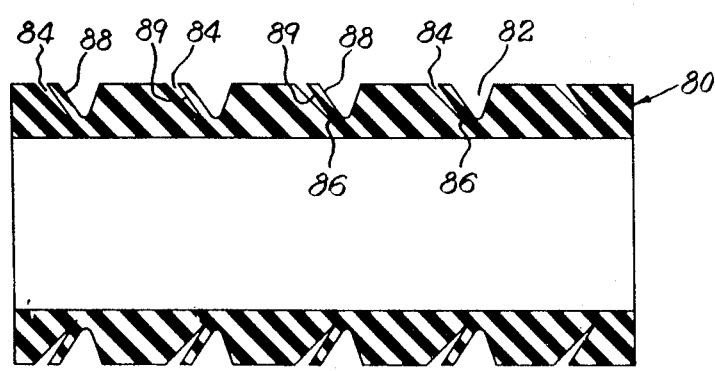
FIG. 9 shows plurality of connected seals made in accordance with the present invention.

Referring now to the drawings, there is shown in FIGS. 1 and 2 an annular seal made in accordance with a first embodiment of the present invention. The seal comprises a generally cylindrical tubular member or ring 1, which is preferably made of an elastomeric material such as rubber and has an outer boundary surface 2 and an inner boundary surface 3 which are concentric with the central longitudinal axis of the ring 1. The axial ends of the ring 1 are defined by two separate surfaces of revolution, an outer surface 4 and an inner surface 5 which are preferably of the same configuration. A separation, in the present instance, an upwardly open annular groove 7 of V-shaped cross section is provided in the outer peripheral surface of the ring 1 adjacent one axial end thereof. The groove 7 cooperates with the inner surface 5 to define an annular sealing lip 6 whose inner surface 5 constitutes an inwardly directed surface of revolution which in the present instance is conical. The conical surface of revolution 5 is formed so that it is disposed at an angle of between 30° and 60° preferably about 45°, to the central axis of the ring 1. In the present instance the inwardly directed surface of revolution 5 is parallel to one wall of the groove 7 to provide a flexible lip of uniform thickness.

In accordance with the method of making a seal of the type illustrated in FIGS. 1 and 2, the conical surfaces of revolution 4 and 5 are formed at axial ends of the ring 1 and thereafter a separation, in the present instance, in the form of a V-shaped annular groove extending from the outer peripheral surface of the ring 1 is provided adjacent one axial end thereof to define the flexible sealing lip 6.

As illustrated in FIG. 2, the ring 1 is adapted to be mounted on a shaft 8 adjacent transverse surface 9 on a bearing housing or the like whereby the sealing lip engages the surface 9. The shaft 8 is preferably of a slightly larger diameter than the inner diameter of the ring 1 in its nonexpanded condition. In the mounted position, the resilient ring 1 is thus expanded around the shaft 8 whereby the sealing lip 6 may be located in a correct position relative to the transverse surface 9 to provide the sealing action. As illustrated in FIG. 2, when the sealing ring is disposed in a proper position relative to the transverse surface 9, the sealing lip 6 engages the surface 9 and is deflected slightly to provide a desired sealing pressure against the transverse surface 9. As illustrated in the drawings the body portion is preferably of a mass at least twice the mass of the sealing lip 6 to provide in combination with the smaller inner diameter of the seal relative to the shaft the sole means for fixedly securing the sealing ring against axial and rotational displacement on the shaft in position to cause the flexible lip 6 to beat against the housing wall 9 and seal the opening.

A seal made in accordance with a second embodiment of the present invention is illustrated in FIGS. 3–5 inclusive. As illustrated, the seal comprises a generally cylindrical tubular member or ring 20 having a sealing lip 22 at one axial end thereof with an inwardly directed surface of revolution 23 which is conical. In the present instance the sealing lip is formed by a circumferential groove or slit which may extend radially of the ring as at 24 in FIG. 3 or at an angle to the central axis of the ring as at 26 in FIG. 5. In order that the sealing lip 22 of this embodiment function in the same manner as the sealing lip 6 described above, the shaft 27 on which it is mounted is provided with a circumferential groove 28. The shaft 27 is preferably of a slightly larger diameter than the inner diameter of the ring in its nonexpanded condition. By this arrangement, when the seal is positioned on the shaft in the manner illustrated in FIG. 5, the sealing lip 22 is deflected towards the transverse surface 30 and engages the transverse surface with a slight pressure. In accordance with this embodiment of the invention the body portion is preferably of a mass at least twice the mass of the sealing lip 22 to provide in combination with the smaller inner diameter of the seal relative to the shaft the sole means for fixedly securing the sealing ring against axial and rotational displacement on the shaft in position to cause the flexible lip 22 ro bear against the housing wall 30 and seal the opening.

The seal illustrated in FIGS. 3–5 is made in accordance with the second embodiment of the present invention by forming conical surfaces of revolution at axial ends of the ring 20 and thereafter forming a separation in the form of a slit extending from the outer peripheral surface of the ring adjacent to but short of the inner peripheral surface thereof to define the flexible lip 22. The slit may be formed by advancing a cutting tool in a radial direction to form the seal shown in FIG. 3 and in a direction parallel to the conical surface of revolution 23 to form the seal shown in FIG. 4.

The seal illustrated in FIG. 6 is substantially identical to that illustrated in FIGS. 1 and 2 comprising a generally cylindrical tubular member or ring 40 having a flexible sealing lip 42 at one axial end thereof defined by an upwardly open annular groove 49 of V-shaped cross section and an inwardly directed conical surface of revolution 46. However, in accordance with this embodiment of the invention, the apex of lip is defined by the inwardly directed surface of revolution 46 and a conical surface 48 having its apex confronting the transverse surface which is adapted to engage.

The method of making the seal illustrated in FIG. 6 is substantially identical to that described above in connection with the seals illustrated in FIGS. I and 2 and additionally includes the step of shaping the outer peripheral edge of the sealing lip to provide conical surface 48.

FIG. 7 illustrates a seal made in accordance with still another embodiment of the present invention wherein the surface of revolution of each axial end of the ring is curved at 54 and 56 preferably generated by an arc of a circle. It is noted that this construction is more compact that the seals discusses above.

In accordance with the present invention. the seal illustrated in FIG. 7 is made by forming a curved surface of revolution preferably generated by an arc of a circle at each axial end of the ring and thereafter forming a separation in the form of a V-shaped groove adjacent one axial end of the ring to provide a flexible sealing lip.

As illustrated in the drawings, in the embodiments of FIGS. 6 and 7, the body portion of the seal is preferably of a mass of least twice the mass of the sealing lip to provide in combination with the smaller inner diameter of the seal relative to the shaft the sole means for fixedly securing the sealing ring against axial and rotational displacement on the shaft in position to cause the flexible lip to bear against the housing wall and seal the opening.

FIG. 9 illustrates an assembly of interconnected seals made in accordance with still another embodiment of the present invention. As illustrated, the assembly comprises an elongated tubular member 80 made of an elastomeric material having a plurality of axially spaced separations in the form of annular V-shaped grooves 82 formed therein which extend from the outer peripheral surface of the tubular member 80 to a point adjacent to but spaced from the inner peripheral surface thereof. A second set of annular separations in the form of slits 84 is provided in the tubular member which are disposed at an angle to the central axis of the tubular member adjacent the grooves 82. The slits 84 extend from the outer peripheral surface of the tubular member to a point closer to the inner peripheral surface than the V-shaped grooves, thereby to define a plurality of seals interconnected to one another by a thin web 86.

As illustrated, the slits 84 separate the tubular member into a plurality of seals, each of which is characterized by conical axial end faces and a flexible sealing lip 88 between the annular groove 82 and the inwardly directed conical surface of revolution 89. The thin web 86 connecting adjacent seals is easily broken when it is desired to separate the seals from one another.

The arrangement described above may be made in accordance with the present invention by forming the annular V-shaped grooves at axially spaced points along the length of the tubular member and thereafter providing slits adjacent the V-shaped grooves which extend closer to the inner peripheral surface than the V-shaped grooves to thereby define a plurality f interconnected seals each having parallel conical axial end faces and a flexible sealing lip adjacent one axial end thereof.

There is shown in FIG. 8 an example of apparatus 59 for making in accordance with the present invention. In accordance with the present invention, an elongated tube 60 of elastomeric material is positioned in a mandrel 62 of relatively soft material such as wood, rubber or the like. The mandrel 62 is rotated by suitable means for example a lathe. Thereafter, when forming a seal such a shown in FIGS. I and 2, V-shaped grooves 64 are formed in the tube 60 at axially spaced points therein by cutting or grinding. It is noted that these grooves 64 may be formed prior to mounting the tube 60 on the mandrel by cutting, grinding or by a molding process. Thereafter, the tube 60 is divided into the rings by means of pointed cutting tools 70 which engage and cut the tube adjacent each of the annular grooves 64 along the surfaces of revolution that are parallel to and conform to one side of the annular grooves 64 formed in the tubes 60.

As illustrated in FIG. 8, the cutting tools 70 are mounted in a plate 72 which is adapted to be moved obliquely towards an away from the mandrel 62 for cutting the tube 60 in the manner described above to form the sealing rings. A guide member 63 is connected to the plate 72 through an adjustable coupling (not shown) and engages in of the V-shaped grooves 64 as indicated to locate the plate 72 and its associated cutting tools in a desired position relative to the tube. The plate 72 is also movable axially of the mandrel 62 and is adjustable with respect to the guide members 63 whereby the thickness of the sealing lip can be controlled selectively and the seals are thereby adapted for use in a variety of applications. For example, oil seals required a slightly more rigid sealing lip that do dust seals. Further, in certain cases the thickness and mass distribution of the lip is chosen in such a way that at low speeds the sealing lip will rub and at high speeds it will be thrown outwards, and away from the surface against which that lip rubs at low speeds, by the centrifugal force thereby forming a gland.

When it is desired to make a seal of the type illustrated for example in FIG. 3 the radially extending slits 24 in the seal may be made by means of radially directed cutting tools prior to or after mounting the tubular member on the mandrel 62. The angled slits 26 of the seal shown in FIG. 4 may be formed obliquely arranged cutting tools prior to or after mounting the tubular member on the mandrel 62. Thereafter, the tools 70 are employed as described above so that the tubular member may be separated into a plurality of seals each having conical axial end faces.

In employing the apparatus to make a seal as shown in FIG. 6, a further set of cutting tools 74 is employed to provide the conical surface 48. The cutting tools 74 are fixed to a plate 76. In order to demonstrate the operation of the cutting tools 70 and 74, they have been illustrated in cutting engagement with the tube in FIG. 8. However, during normal operation, the tools 70 and 74 alternately engage the tube and in a preferred embodiment of the apparatus the plates 72 and 76 are therefore mounted in such a way that when one plate moves toward the mandrel 62, the other moves away from the mandrel. Additionally the conical surfaces 48 preferably should be cut with the tools 74 before the tube 62 is operated upon the cutting tools 70 as described above for the purpose of dividing it into rings.

In connection with the seals shown in FIG. 7, the apparatus may be employed to form the curved axial end faces by moving them in an axial as well as radial direction during their movement towards the mandrel thereby to provide the rounded surfaces of revolution at the axial ends of the ring.

When employing the apparatus 59 to make an assembly of interconnected seals as shown in FIG. 9, the cutting tools are controlled to leave a thin web connecting adjacent rings.

While the method of making seals in accordance with the present invention has been illustrated and described herein in connection with a particular apparatus, it is, of course, to be understood that changes and modifications may be made therein within the scope of the following claims:

We claim:

1. A method of making an annular seal from a generally cylindrical tubular member of an elastomeric material and of substantially uniform thickness for its entire length consisting of the steps forming a recess defined by an inwardly directed surface of revolution at one axial end of said tubular member and providing a deep annular separation in said tubular member adjacent said one axial end extending from the outer peripheral surface of said tubular member inwardly to, and terminating at a point adjacent the inner peripheral surface of said tubular member to provide a thin flexible sealing lip at said one axial end between said annular separation and said surface of revolution and thereby dividing said tubular member into a body portion of at least twice the mass of the sealing lip.

2. A method of making an annular seal from a generally cylindrical tubular member of an elastomeric material and of substantially uniform thickness for its entire length consisting of the steps of forming a recess defined by an inwardly directed conical surface of revolution at one axial end of said tubular member and providing a deep V-shaped annular groove in said tubular member adjacent to and spaced from said one axial end and extending from the outer peripheral surface of said tubular member inwardly to, and terminating at, a point adjacent the inner peripheral surface of said tubular member to provide a thin flexible sealing lip at said one axial end, and thereby dividing said tubular member into a body portion of at least twice the mass of the sealing lip.

3. A method of making an annular seal from a generally cylindrical tubular member of an elastomeric material and of substantially uniform thickness for its entire length consisting of the steps of forming a recess defined by an inwardly directed curved surface of revolution generated by an arc of a circle at one axial end of said tubular member and providing a deep annular separation in said tubular member adjacent said one axial end extending from the outer peripheral surface of said tubular member inwardly to and terminating at, a point adjacent the inner peripheral surface of said tubular member to provide a thin flexible sealing lip at said one axial end between said annular separation and said surface of revolution and thereby dividing said tubular member into a body portion of at least twice the mass of the sealing lip.

4. A method of making annular seals from a cylindrical tube of an elastomeric material consisting of the steps of forming a plurality of deep axially spaced annular separations in said tube extending from the outer peripheral surface thereof inwardly to, and terminating at, a point adjacent the inner peripheral surface of said tube, and thereafter severing said tube at a plurality of axially spaced locations along a surface of revolution disposed at an acute angle to the central axis thereof adjacent to and axially spaced from said annular separations to provide a plurality of annular seals each having an inwardly directed surface of revolution at one axial end adjacent said annular separation and a thin flexible sealing lip between said annular separation and said surface of revolution.

5. A method of making a plurality of interconnected annular seals from a tube of an elastomeric material consisting of the steps of forming a plurality of deep axially spaced tubular separations in said tubular member extending from the outer peripheral surface of the tube inwardly to, and terminating at a point adjacent the inner peripheral surface thereof, positioning said tube on a rod made of a relatively soft material and having an outer diameter which is slightly larger than the inner diameter of the tube, advancing a cutting tool at an angle of between 30° and 60° relative to the axis of rotation of said rod to cut said tube to form a plurality of axially spaced annular slits extending at an angle to the axis of said rod from the outer peripheral surface of said tube to a point spaced from the inner peripheral surface thereof whereby a plurality of seals interconnected by a thin web of material is provided, each seal being characterized by an inwardly directed conical surface of revolution at one axial end spaced from said annular separation thereby defining a thin flexible sealing lip between a conical surface of revolution and an annular separation.